United States Patent
Williams et al.

[15] 3,658,201
[45] Apr. 25, 1972

[54] ARTICLE CARRIER APPARATUS FOR VEHICLES

[72] Inventors: George L. Williams, 808 South Quitman, Denver, 80219; Glen L. Brooks, 4201 South Bannock, Englewood, 80110; Earl M. Eaton, 2840 West Park Place, Denver all of Colo. 80219

[22] Filed: June 25, 1970

[21] Appl. No.: 49,750

[52] U.S. Cl............................214/454, 214/450, 224/42.13, 224/42.21, 224/42.44
[51] Int. Cl......................................................B62d 43/00
[58] Field of Search ..........................214/451, 452, 453, 454; 224/42.21, 42.06, 42.08, 42.12, 42.13, 42.24, 42.14, 42.43

[56] References Cited

UNITED STATES PATENTS

| | | | |
|---|---|---|---|
| 1,693,922 | 12/1928 | Herd.....................................| 224/42.13 |
| 2,556,101 | 6/1951 | Negin et al........................| 224/42.13 X |
| 1,809,119 | 6/1931 | Haffke...............................| 224/42.21 X |
| 3,362,597 | 1/1968 | Beach.................................| 214/454 X |
| 1,008,680 | 11/1911 | Temple...............................| 224/42.14 |
| 1,624,493 | 4/1927 | Malm..................................| 224/42.13 |

FOREIGN PATENTS OR APPLICATIONS 557,139 10/1922 France................................224/42.08

*Primary Examiner*—Gerald M. Forlenza
*Assistant Examiner*—Jerold M. Forsberg
*Attorney*—Reilly and Lewis

[57] ABSTRACT

An article carrier for vehicles includes a support frame having a pivotal attachment member arranged to attach to the vehicle frame so as to permit the carrier to be pivoted to an out-of-the-way position without removing the carrier from the vehicle. A wheel mount is located centrally of the frame and a pair of article supports extend laterally from opposite sides of the wheel mount. A pair of laterally spaced vehicle attachment members are provided at opposite sides of the article supports which are arranged to releasably fasten to existing vehicle tailgate structure. The article supports are disposed inwardly of a mounted wheel and tire on the wheel mount which overlaps the article supports to shield them against damage in a possible rear-end collision. The article supports are arranged to receive conventional gasoline cans and are provided with a releasable hold-down member to firmly secure the cans in place and the wheel mount is also hollow and has a movable closure wall to carry tools and the like.

16 Claims, 7 Drawing Figures

Patented April 25, 1972
3,658,201
2 Sheets-Sheet 1
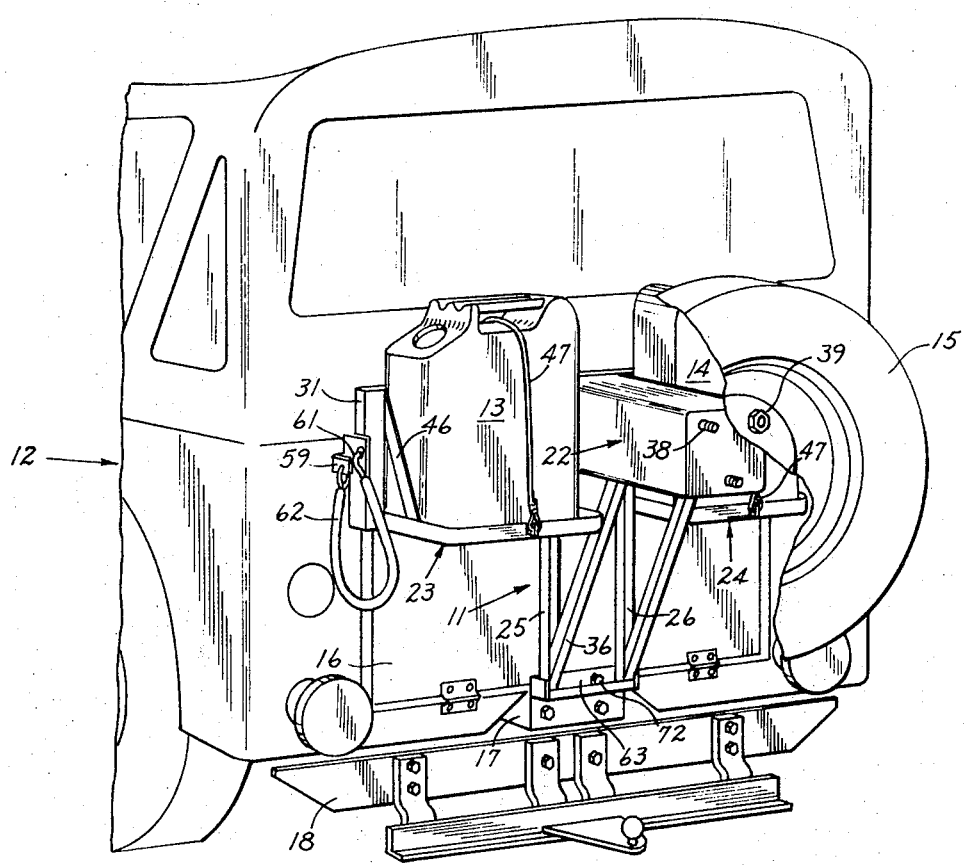
FIG. 1
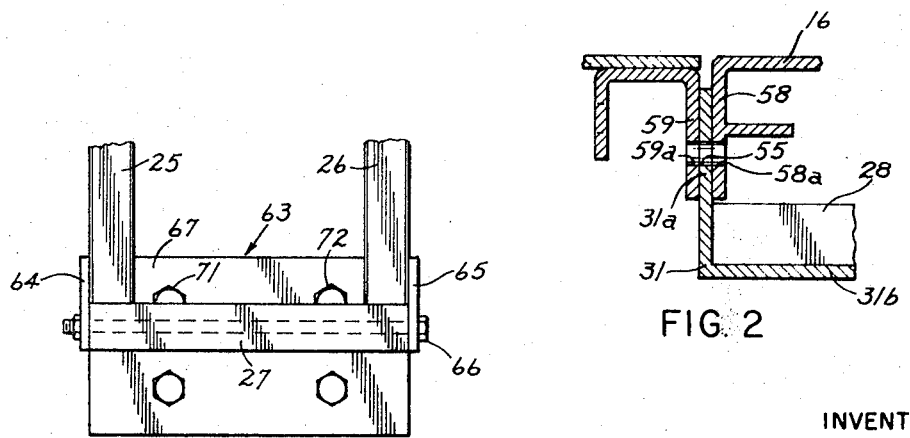
FIG. 3
FIG. 2
INVENTORS
GEORGE L. WILLIAMS
GLEN L. BROOKS
EARL M. EATON
BY
Reilly and Lewis
ATTORNEYS Patented April 25, 1972
3,658,201
2 Sheets-Sheet 2
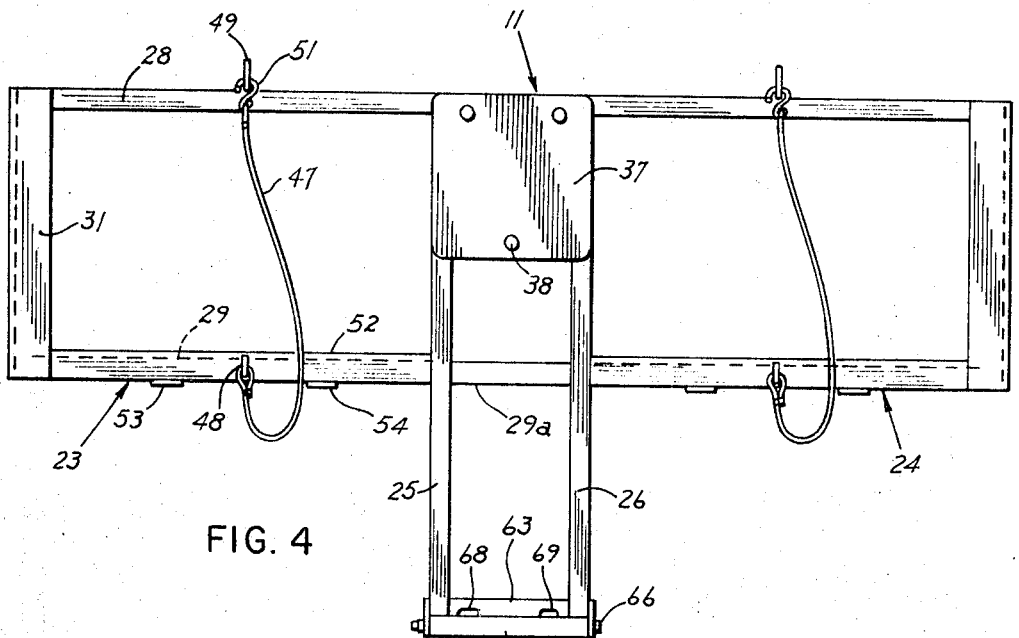
FIG. 4
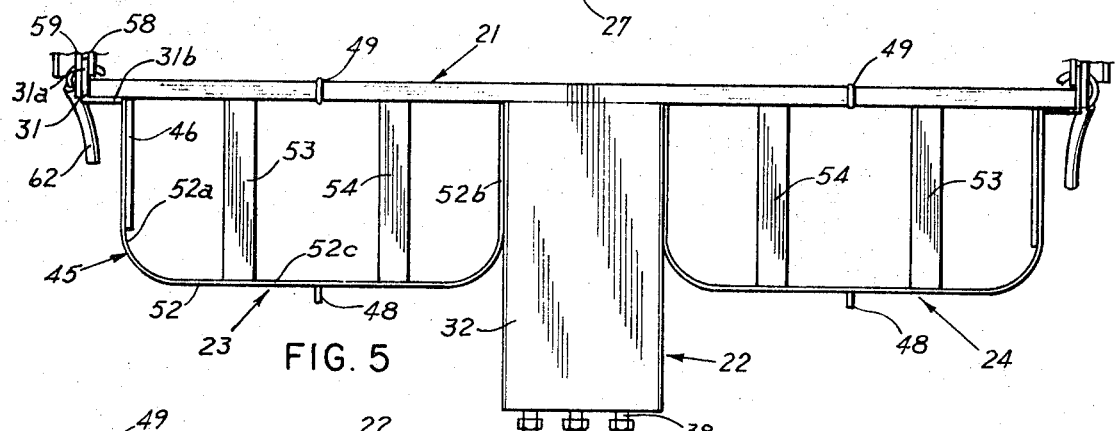
FIG. 5
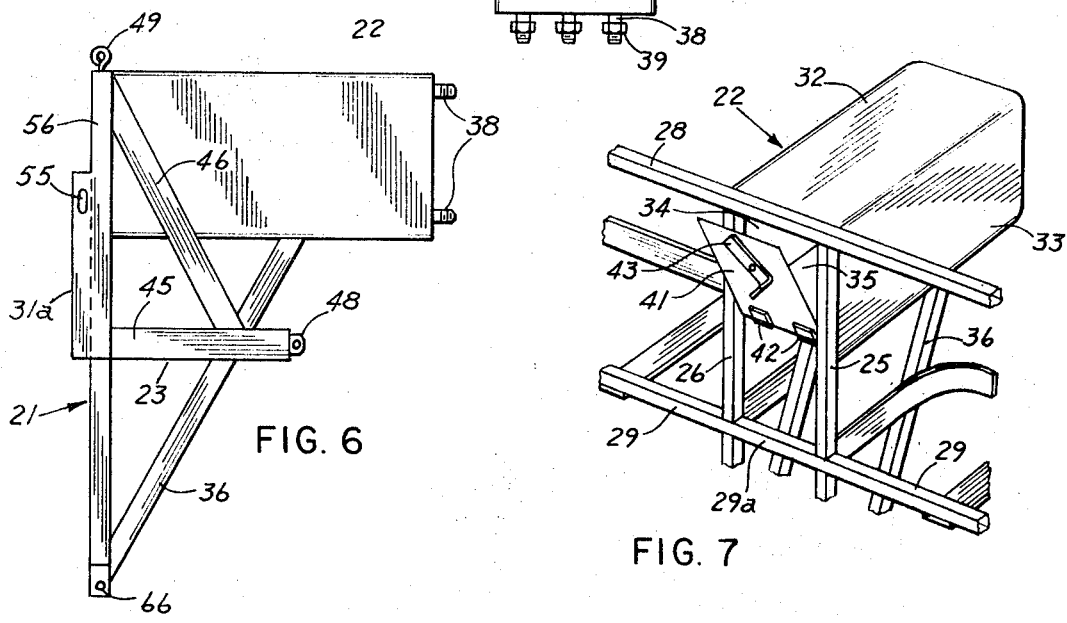
FIG. 6
FIG. 7

ARTICLE CARRIER APPARATUS FOR VEHICLES

This invention relates to article carriers and more particularly to a novel vehicle article carrier specifically adapted to be mounted at the rear of a vehicle equipped with a tailgate.

Presently, motor vehicles, such as Jeeps, which are frequently driven in remote areas are relatively limited as to interior space and it is highly desirable to be able to carry additional necessary articles for use in operating the vehicle such as cans of gasoline, the spare tire, and tools preferably outside the vehicle. Some attempts have been made to provide exterior article carriers for Jeep-type vehicles but in general they have usually required some modification of the vehicle structure including the drilling of holes into the body thereof. This practice is not entirely satisfactory or accepted, particularly with new vehicles.

Accordingly, it is an object of this invention to provide a simple, reliable and durable vehicle article carrier which is readily attached exteriorly of a vehicle without requiring modification thereof.

A further object of this invention is to provide an external carrier for the support of necessary articles for use in the operation and maintenance of vehicles such as cans of gasoline, spare tire and tools, with the spare tire being supported in such a way as to protect the cans of gasoline in the event of a rear-end collision.

Still a further object of this invention is to provide an improved vehicle article carrier which is easily accessible for the use thereof externally of the vehicle and is principally characterized by one or more article supports provided with vehicle attachments at suitably spaced positions and specifically arranged to releasably attach to the tailgate and frame of a Jeep-type vehicle and the like.

In accordance with the present invention in a preferred embodiment there is provided a support frame with an upright support pivotally attached at its lower end to the vehicle frame below the tailgate to permit the carrier to pivot down and away from the tailgate for the opening of the tailgate without removing the carrier from the vehicle. An elongated wheel mount formed of a tubular body is attached centrally and at an upper position on the frame to support a spare tire and wheel and article supports are disposed outwardly on each side of the wheel mount with a wheel and tire laterally overlapping the article supports to shield them against possible rear-end collisions. A pair of laterally spaced vehicle attachment members on opposite sides of the article supports releasably insert into a slot between the tailgate lug and body lug on each side of the tailgate and are fastened by the tailgate hook. The frame and article supports are made of relatively lightweight tubular, flat bar, and right-angle stock preferably of a metal material and welded together as an integral articulated unit.

Other objects and advantages of the present invention will become more readily appreciated and understood from the following detailed description of a preferred form of the present invention when taken together with the accompanying drawings, in which:

FIG. 1 is a rear fragmentary perspective view of a Jeep-type vehicle having a carrier embodying features of the present invention mounted in an operative position thereon;

FIG. 2 is an enlarged fragmentary horizontal sectional view through one upper carrier attachment member and the associated vehicle tailgate structure;

FIG. 3 is an enlarged rear elevation view of the lower attachment bracket secured to the vehicle frame;

FIG. 4 is an elevation view of the carrier shown in FIG. 1 when viewing the rear of the vehicle;

FIG. 5 is a top plan view of the carrier shown in FIGS. 1 and 4;

FIG. 6 is a side elevation view of the carrier shown in FIGS. 1, 4 and 5; and

FIG. 7 is a fragmentary perspective view of a portion of the carrier as seen from inside the vehicle.

Referring now in detail to the drawings, FIG. 1 illustrates a carrier 11 embodying features of the present invention mounted at the rear of a conventional Jeep-type vehicle 12 and is shown as carrying a pair of conventional gasoline cans 13 and 14 and a spare wheel and tire 15 for the vehicle at an exterior position rearwardly of the vehicle. The conventional Jeep-type vehicle shown also includes a tailgate 16, rear frame structure represented at 17 and a rear bumper 18 below frame structure 17.

The article carrier 11 shown, broadly comprises a support frame 21, a wheel mount 22 projecting rearwardly from a central upper portion of the support frame and a pair of receptacle holders 23 and 24 extending laterally from opposite sides of the wheel mount 22 and projecting rearwardly from the support frame 21 which are specifically adapted to releasably support conventional gasoline cans 13 and 14, respectively.

The support frame 21 shown is of a generally open, box-type construction and includes an upright support formed of a pair of laterally spaced, upright support members 25 and 26 with a lower end support member 27 connected to the lower ends of said upright support members 25 and 26 together with a pair of lateral supports extending laterally from opposite sides of the upright support members and tire mount. Each lateral support is of a similar construction so that a description of one applies to both and each is formed of upper and lower parallel support members 28 and 29 and an outer end support member 31 connected between the ends of the upper and lower support members and the lateral support members are also used as a forward wall for holding the gasoline cans in place as described more fully hereinafter. The support members 25, 26, 27, 28 and 29 are formed of square tubular stock and the end members 31 of right-angle stock. The upper support is shown as being made of a pair of single pieces of square tubular stock with the lower support member 29 having an intermediate portion 29a extending transversely between members 25 and 26.

The wheel mount 22 comprises an elongated support member formed of square tubular stock having a top wall 32, side walls 33 and 34 and a bottom wall 35. The support member is secured at its forward end along its side walls 33 and 34 to the upright support members 25 and 26, respectively, and is further supported by a pair of inclined braces 36 which extend from the lower end portions of the upright support members 25 and 26 to bottom wall 35 between the forward and rear ends of the wheel support member. The wheel support member is further provided with an outer end wall 37 on which there are carried three wheel bolts 38 suitably arranged thereon to align with the apertures in the vehicle wheel so that the tire and wheel 15 shown in FIG. 1 may be firmly attached on the wheel support member using nuts 39 threaded on bolts 38. The wheel support member is further provided with a movable closure wall 41 at its forward end pivotally attached to the bottom wall 35 by hinges 42. A latch 43 is pivotally mounted thereon and will insert into a slot in the upper support member 28 to hold the movable closure wall 41 in a closed position, and this arrangement permits the wheel mount to function also as a tool box to carry tools.

Each of the supports for the gasoline cans is essentially a rack-like structure and includes a shelf-like base 45 projecting outwardly from the lower support member 29. An outer inclined brace 46 extends between the end member 31 and an outer side of the base 45 and a side wall of the wheel mount is disposed along the inner side of the support. A hold-down cable 47 is secured at its lower end to an apertured ear 48 at the outer end of the base 45 and an eyebolt 49 on the upper support member 28 to firmly hold the gasoline can in place. The cable preferably has a hook 51 at its upper end which releasably connects to eyebolt 49.

Each base 45 is of a generally recessed construction opening at the top so that the gasoline can or a like receptacle will insert thereinto from above and be held against sliding movement by the wall sections of the base. The base shown comprises a U-shaped retainer member 52 formed from a flat piece of stock having an outer side leg 52a secured to the end member 31 adjacent support member 29 and an inner side leg 52b extending along the tire mount side wall and secured at its end to the lower support member 29. The side legs are connected by a rear transverse leg 52c parallel to member 29. A pair of base support members 53 and 54 formed of straight flat stock connect at intermediate spaced positions along the side legs and connect between the transverse leg and lower support member 29 on which the gasoline can is directly seated.

The end support members 31 are located laterally outwardly of the support bases and these end support members are formed of right-angle stock having one leg 31a extending forwardly and the other leg 31b extending laterally and inwardly toward the wheel mount. A slot 55 is provided in the forwardly extending leg or projection 31a and this leg is sized so that it will releasably insert between a rearwardly projecting tailgate lug 58 and the adjacent rearwardly extending vehicle body lug 59 which are conventional tailgate structure of Jeep-type vehicles to hold the tailgate closed. Lug 58 has a slot 58a and lug 59 has a slot 59a and these slots align with each other and with carrier slot 55 so that a hook 61 normally carried on a rubber-covered chain 62 on each side of the vehicle to fasten the tailgate will insert through these aligned slots to firmly fasten the opposite sides of the carrier to the vehicle at laterally spaced upper positions. The forward leg of the end members 31 has a cut-out section 56 above the slot 55 to provide clearance for the carrier.

The lower pivotal attachment structure for the support frame is in the form of a U-shaped bracket 63 having rearwardly projecting legs 64 and 65 disposed outwardly of the lower support frame and pivotally connected to the frame using an elongated bolt 66 which extends through aligned apertures in the legs 64 and 65 as a pivot member. A base plate portion 67 of the bracket connecting legs 64 and 65 is provided with spaced slots 68 and 69 through which bolts 71 and 72 extend to fasten the bracket 63 to the frame structure 17 of the vehicle. This provides a pivotal attachment for the lower end of the carrier which will permit it to pivot to an out-of-the-way position so that it does not interfere with the movement of the tailgate without detaching the carrier from the vehicle.

From the foregoing it is apparent that the carrier apparatus is readily fastened to the vehicle utilizing the existing structure and it may be made of tubular, right-angle and flat bar stock welded together as an integral articulated unit. While particular vehicle attachment members have been described which lend themselves to a quick attachment operation, it is understood that other forms of attachment members and fasteners could be employed.

Although the present invention has been described with a certain degree of particularity, it is understood that the present disclosure has been made by way of example and that changes in details of structure may be made without departing from the spirit thereof.

What is claimed is:

1. An article carrier for vehicles and the like comprising a support frame including an upright support and lateral portions extending laterally from opposite sides of said upright support, said upright support having first lower vehicle attachment means, a wheel mount projecting rearwardly from an upper portion of said support provided with wheel attachment means at its rear end, a pair of article support means extending laterally outwardly from opposite sides of said wheel mount along said lateral portions and positioned forwardly of said wheel attachment means so that said article support means is separated by said wheel mount and is laterally overlapped by a tire and wheel mounted on said wheel mount, said pair of article support means being connected to each other solely through said support frame, and second upper vehicle attachment means on said lateral portions including laterally spaced releasable attachment portions disposed on opposite sides of said lateral portions and above said first lower vehicle attachment means adapted for releasable attachment to said vehicle.

2. An article carrier as set forth in claim 1 including releasable hold-down means cooperating with said article support means for holding an article on said article support means.

3. An article carrier as set forth in claim 1 wherein said vehicle has a pair of spaced slotted portions along a side thereof and said second vehicle attachment means includes a pair of spaced, slotted projections disposed in an upper position on the frame adapted to releasably insert into said spaced slotted portions on the vehicle.

4. An article carrier as set forth in claim 1 wherein said first vehicle attachment means includes an attachment bracket adapted to releasably fasten to the vehicle, said bracket being pivotally connected to the lower end of said support frame to permit the frame to pivot downwardly from the vehicle.

5. An article carrier as set forth in claim 1 wherein said wheel mount includes an elongated support member attached at one end to an upper portion of said support frame and having wheel bolts projecting outwardly from the other end of said support member for the releasable support of said tire and wheel.

6. An article carrier as set forth in claim 5 wherein said support member is in the form of a tubular body having a movable cover plate in one wall of the body adapted to move between open and closed positions to provide access to a storage zone within said body for the storage of tools and the like.

7. An article carrier for vehicles and the like comprising a support frame including an upright support with lower vehicle attachment means at the lower end of said upright support adapted for attachment to the vehicle, a wheel mount projecting from an upper portion of said upright support having wheel attachment means at a rear end, a pair of article supports connected to said support frame and separated by a rearwardly extending portion of said wheel mount and extending laterally from opposite sides of said wheel mount and rearwardly along said wheel mount and terminating forwardly of said wheel attachment means so that the article supports are overlapped by a tire and wheel mounted on said wheel mount, and a pair of upper laterally spaced vehicle attachment means secured to said support frame disposed laterally of and forwardly of said article supports adapted for attachment to said vehicle.

8. An article carrier as set forth in claim 7 including a pair of upper and lower lateral support members extending outwardly from each side of said upright support, a shelf-like base projecting outwardly from said lower support member on which said article is seated, and a hold-down member releasably connected between an outer end portion of said base and said upper lateral support member.

9. An article carrier as set forth in claim 7 wherein said base includes an open upper recessed area for retaining the lower end of an article seated therein.

10. An article carrier as set forth in claim 9 wherein said base recessed area is shaped to receive a conventional gasoline can.

11. An article carrier as set forth in claim 7 wherein said upright support includes a pair of laterally spaced upright tubular members and a pair of vertically spaced upper and lower tubular members connected to the ends of said upright tubular members.

12. An article carrier as set forth in claim 11 wherein said lateral supports include a pair of spaced upper and lower tubular members and an end member connecting the outer ends of said tubular members.

13. An article carrier for a vehicle having a tailgate with spaced lugs on each side of the tailgate, a rear vehicle body portion having a lug spaced outwardly from each said tailgate lug to define a slot therebetween, a hook carried on each side of the vehicle adapted to extend through slots in each adjacent body portion and tailgate lugs to hold the tailgate in a closed position, and frame structure on the vehicle below the tailgate, said carrier comprising a frame with an upright support having a pivotal vehicle attachment member at a lower portion of said upright support attached to said vehicle frame structure, a pair of lateral supports projecting outwardly from the opposite sides of said upright support, said lateral supports having upright end portions at their outer ends, said upright end portions having slotted vehicle attachment projections inserted into said vehicle slots and releasably held between adjacent of said body portion lugs and tailgate lugs by said hooks, a wheel mount projecting from an upper portion of said upright support and provided with wheel attachment bolts at a rear end of said wheel mount, a pair of article supports on opposite sides of the wheel mount extending along said lateral supports and terminating forwardly of said wheel bolts, said article supports including a rearwardly extending shelf-like base, said lateral supports defining a forward upright wall support for an article on said base and each article support including upper and lower lateral support members, and a hold-down member releasably connected between said upper lateral support member and said base to hold the article in place on said base.

14. An article carrier as set forth in claim 13 wherein said end portions of the lateral supports are formed of right-angle stock having a forwardly projecting leg defining said vehicle attachment projections.

15. In carrier apparatus for supporting articles on a Jeep-type vehicle having a tailgate with lugs on each side, a lug on the vehicle body adjacent each tailgate lug defining a slot between each adjacent of said tailgate and body lugs, a tailgate fastening member operatively associated with each adjacent tailgate and body lug and vehicle support structure below the tailgate, the combination of a carrier support frame including an upright support provided with a lower attachment member secured to the vehicle support structure below the tailgate and pivotally connected to the lower end of said upright support whereby the support frame may pivot outwardly and downwardly to facilitate opening of said tailgate, article support means supported by said frame and extending laterally outwardly from said upright support rearwardly of the tailgate, and a pair of laterally spaced vehicle releasable attachment members supported by said frame projecting forwardly into said slots on each side of the vehicle, said vehicle releasable attachment members being releasably held in said slots by said tailgate fastening members.

16. In carrier apparatus as set forth in claim 15 wherein said article support means includes at least one receptacle support, a tire mount adjacent and extending along one side of said receptacle support, and a tire and wheel mounted on the tire mount in an overlapping relation to said receptacle holder.

* * * * *